United States Patent [19]
Fidei et al.

[11] 3,895,246
[45] July 15, 1975

[54] LIQUID COOLED ROTOR FOR DYNAMOELECTRIC MACHINES

[75] Inventors: Frank P. Fidei, Pittsburgh; Warren W. Jones, Jr., Acme; George F. Dailey, Pittsburgh, all of Pa.

[73] Assignee: Westinghouse Electric Corporation, Pittsburgh, Pa.

[22] Filed: Feb. 21, 1974

[21] Appl. No.: 444,582

[52] U.S. Cl. .................................................. 310/61
[51] Int. Cl. ........................................... H02k 1/32
[58] Field of Search ............ 310/54, 52, 64, 65, 58, 310/59, 61

[56] References Cited
UNITED STATES PATENTS

| | | | |
|---|---|---|---|
| 3,145,314 | 8/1964 | Becker | 310/61 |
| 3,393,333 | 7/1968 | Kudlacik | 310/61 |
| 3,457,440 | 7/1969 | Horsley | 310/52 |
| 3,469,125 | 9/1969 | DieterKranz | 310/64 |
| 3,543,062 | 11/1970 | Banchieri | 310/54 |
| 3,686,522 | 8/1972 | Konovalov | 310/54 |
| 3,718,830 | 2/1973 | Philofsky | 310/64 |
| 3,733,502 | 5/1973 | Curtis | 310/61 |
| 3,740,595 | 6/1973 | Heller | 310/52 |

*Primary Examiner*—R. J. Skudy
*Attorney, Agent, or Firm*—G. H. Telfer

[57] ABSTRACT

A dynamoelectric machine such as a large turbine generator is provided with a rotor having passages for coolant liquid extending through the winding conductors. An exciter is coupled to the shaft of the generator rotor and coolant liquid for the rotor is supplied to the generator and discharged therefrom through the exciter shaft. Provisions are made for accommodating both entrance and discharge coolant passages and also the generator field leads in the bores of the exciter and rotor shafts, and for connecting the coolant passages and the field leads within the mechanical coupling between the shafts. Provision is also made for directing the liquid from the rotor shaft entrance passage to the winding conductors and from the winding back to the discharge passage.

8 Claims, 6 Drawing Figures

LIQUID COOLED ROTOR FOR DYNAMOELECTRIC MACHINES

BACKGROUND OF THE INVENTION

The present invention relates to the cooling of dynamoelectric machines such as large turbine generators, and more particularly to means for supplying coolant liquid to and discharging it from a liquid cooled rotor for such machines.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system which has made it possible to attain very high ratings for large generators. The coolant fluid used in these machines heretofore has usually been hydrogen which fills the gas-tight housing and is circulated through the ducts of the stator and rotor windings and through radial or axial ducts in the stator core. As still further increases in the maximum ratings of these large generators have become necessary, further improvements in cooling have been required and can be obtained by the use of more efficient coolant fluids such as liquids. This has been done in stator windings by circulating a liquid coolant such as water through the ducts of the stator winding, with a very considerable improvement in the cooling effect. A substantial further improvement can be obtained by also utilizing liquid coolant in the rotor by circulating a coolant liquid through passages in the rotor winding.

Many problems are involved, however, in circulating a liquid coolant through the rotor of a large generator. One of the most difficult problems is that of introducing the liquid into and discharging it from a rotor of large diameter rotating at high speed, usually 3600 revolutions per minute, and with a relatively large volume of liquid under the substantial pressure necessary to obtain the required flow of liquid through the passages of the rotor winding. The added pressure in the liquid due to the centrifugal force during operation of the machine varies with the square of the radius, and very high pressures occur in fluid passages near the periphery of the rotor. The provision of suitable seals for inlet or discharge ports at the periphery therefore is an extremely difficult problem because of the high pressures that must be contained, and also because of the high surface speed.

It is desirable, therefore, to introduce the liquid and discharge it at as small a radius as possible, and preferably on the axis of the shaft where the centrifugal force on the liquid is a minimum. In the usual arrangement of these large generators, one end of the shaft is directly coupled to a turbine shaft to be driven thereby and is not accessible for introduction of liquid at the axis of the shaft. At the other end of the machine, however, the rotor shaft is usually coupled to one end of an exciter shaft and the other end of the exciter shaft is accessible for introduction of liquid. It has been proposed, therefore, to introduce the coolant liquid through the exciter shaft as in Curtis et al U.S. Pat. No. 3,733,502, and as also suggested in patents to Becker U.S. Pat. No. 3,145,314 and Horsley 3,457,440. The most satisfactory way to do this is to utilize the shaft bores which extend centrally of the shafts throughout their lengths. These shaft bores, however, in the usual practice are already utilized for the field leads which carry the direct current excitation from the exciter to the generator field winding. These leads are necessarily of large physical size in order to carry the relatively high excitation currents required for large generators of the sizes for which liquid cooling is needed. It is necessary, therefore, to provide space in the bores both for the large field leads and for coolant passages of adequate size to carry the necessary flow of liquid. It is also necessary to provide for carrying the flow of liquid and the electrical excitation current through or past the mechanical coupling between the exciter and generator shafts.

These problems have been recognized in the above-mentioned Curtis et al patent which discloses the use of an annular water passage in the generator shaft bore surrounding the field leads so as to make the most effective use of the available space and at the same time to cool the leads themselves. A coupling of special design is also provided for mechanically coupling the shafts together and for directing the coolant water from a central passage in the exciter shaft to the annular passage in the generator shaft. In this arrangement, the water is introduced on the axis of the exciter shaft but there is insufficient room available in the shaft bores for return water passages, and the water flows through the generator rotor winding from one end to the other and is discharged at the opposite or turbine end of the machine. Since the shaft axis is not accessible at this end, because of its connection to the turbine, the water flows from the bore of the generator shaft through radial passages to the surface of the shaft and is there discharged to a stationary chamber from which it can be drained. This, of course, requires seals capable of operation at the high peripheral speed of the shaft surface and of sealing against very high pressure. Radial openings through the shaft are also required which necessarily somewhat weaken it and which are especially undesirable at the turbine end of the machine where the shaft must transmit the full driving torque for the generator and is highly stressed.

SUMMARY OF THE INVENTION

The present invention provides a construction for liquid cooling of the rotor of a large turbine generator in which the coolant liquid is both introduced and discharged through the bore of the exciter shaft, thus eliminating the need for seals, or radial passages in the generator shaft, at the turbine end of the machine. This is accomplished by disposing concentric tubes in the bores of both the exciter and generator shafts to form separate entrance and discharge passages for the coolant, while the field leads are provided in the form of heavy semi-tubular members which enclose the coolant passages and fit within the shaft bores, so that sufficient room is available for both the field leads and the coolant passages. A coupling arrangement is also provided in which the corresponding coolant tubes of the exciter and generator shafts can be coupled together and sealed to prevent leakage of liquid, while corresponding field leads in the two shafts are connected with a flexible connection which permits axial expansion of the leads. A coupling joins the two shafts and encloses the coolant connections and the electrical connections and also provides the necessary mechanical driving connection between the two shafts. In the generator shaft, a transition member is provided which directs the entering liquid through radial passages for flow to the coolant passages in the rotor winding and which also directs the returning heated liquid through separate radial passages to the discharge passage in the shaft. Thus, a compact arrangement is provided in which the coolant liquid is both introduced and discharged at the exciter end of the machine while sufficnet space is made available for the coolant passages and the field leads.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
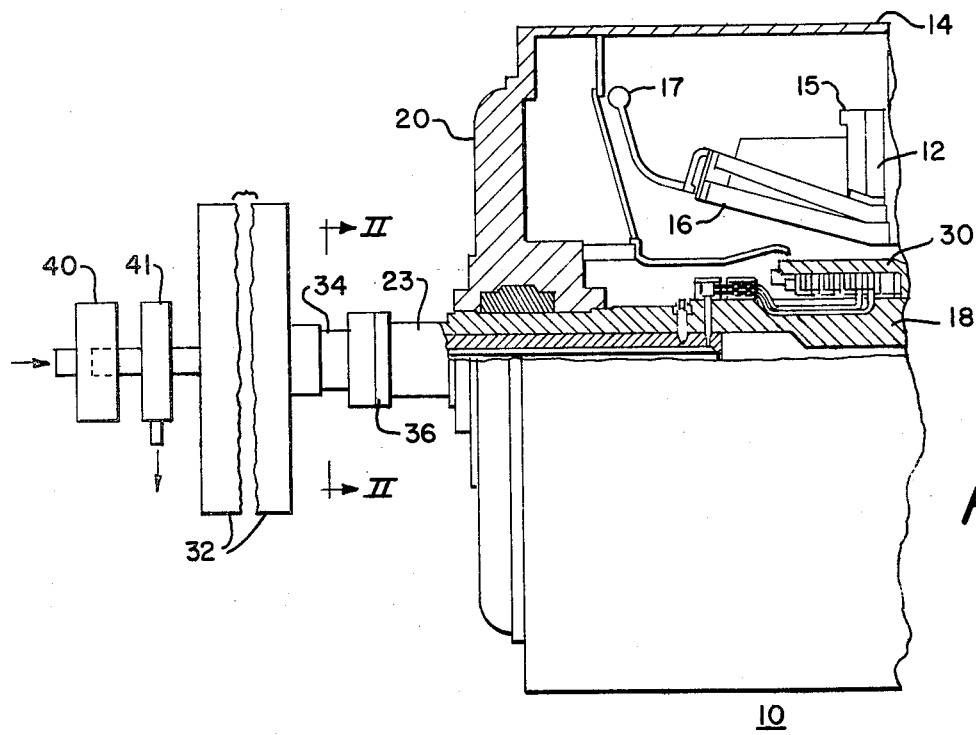
FIG. 1 is a view, partly in longitudinal section and partly in elevation, of a turbine generator and exciter embodying the invention.

The invention is shown in the drawings embodied in a liquid cooled rotor for use in a large turbine generator of typical construction, although it should be understood that the invention may be applied to any desired type of dynamoelectric machine.

Referring first to FIG. 1, there is shown a large generator 10 which has a stator core 12 supported in a substantially gas-tight outer housing 14. The core 12 is of the usual laminated construction having a generally cylindrical bore therethrough, and the laminations are clamped between suitable end plates 15 in the usual manner. The stator core 12 has longitudinal slots in its inner periphery for the reception of a stator winding 16 which may be of any suitable or usual type. The winding 16 is shown as being a liquid cooled winding and circular inlet and discharge manifolds 17 are provided at opposite ends of the machine for circulating a coolant liquid such as water through the coils of the stator winding. The housing 14 is filled with coolant gas, preferably hydrogen, which is circulated through the interior of the housing in the usual manner and suitable baffling of any desired type may be provided in the housing to direct the flow of gas therein. The machine has a rotor 18 which is disposed in the bore of the stator core 12 and supported in end brackets 20 at each end of the housing 14 in bearing assemblies of any desired type which may include gland seals to prevent leakage of gas from the housing.

Figure 4:
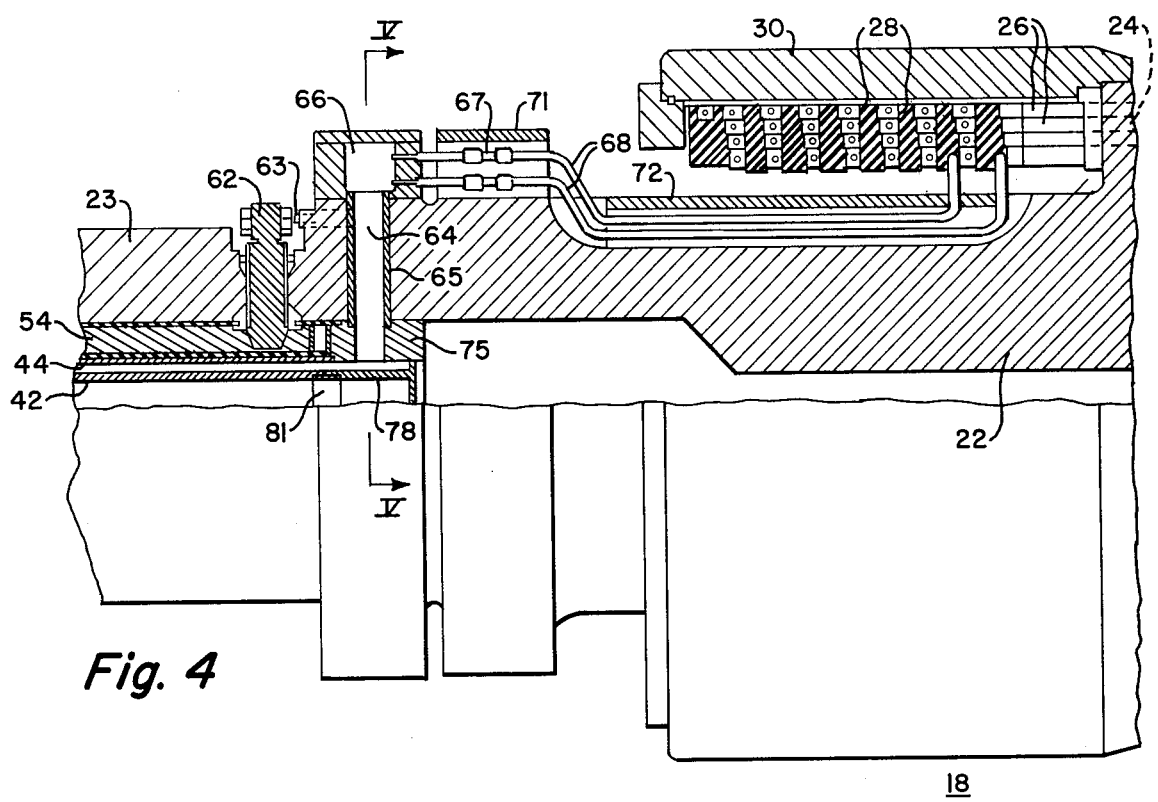
FIG. 4 is a longitudinal sectional view of one end of the generator rotor.

As shown more clearly in FIG. 4, the rotor 18 has a body portion 22 and shaft portions 23 which are preferably integral therewith and extend axially from each end of the body portion. The body portion 22 is provided with peripheral slots in the usual manner for reception of a rotor winding 24. The rotor winding 24, which constitutes the field winding of the generator 10, may be arranged in any suitable manner in the slots of the rotor, usually being arranged in concentric multiturn coils to form either two or four magnetic poles. The winding 24 is constituted of copper conductors 26 which extend longitudinally through the slots of the rotor body and generally circumferentially in the end turn portions 28 which lie beyond the ends of the body portion 22 of the rotor and which are supported against rotational forces by heavy retaining rings 30 in the usual manner. As can be seen in the end turn portions 28 which are visible in FIG. 4, the conductors 26 are hollow, having central passages extending through them through which the coolant liquid can flow from one end of the conductor to the other, although separate tubes or other duct means in good thermal relation to the conductors could, of course, be used. Any suitable or desired type of flow pattern may be utilized for the coolant, and any desired type of electrical circuit may be used.

Field excitation for the generator is provided by an exciter 32. The exciter may be of the brushless type, or it may be of any other suitable type capable of providing the required direct current excitation to the winding 24, and has not been shown in detail since it is not in itself a part of the present invention. The exciter 32 has a shaft 34 which is coupled to the rotor shaft 23 of the generator by a coupling 36 to be driven thereby. The exciter shaft 34 has the usual central bore extending therethrough, and in accordance with the present invention coolant liquid, preferably water, is introduced into the machine and discharged therefrom through this axial bore. For this purpose, two concentric water tubes 37 and 38 are disposed in the exciter shaft bore. The tubes 37 and 38 are arranged coaxially as shown, the tube 37 providing a central passage on the axis of the shaft which is preferably utilized for entrance of water, and the tubes 37 and 38 forming an annular passage between them which is preferably utilized for discharge of the water. Axial fins 39 may be provided, if desired, on the tube 37 to properly space and locate the tubes with respect to each other.

Water is introduced into the tube 37 at the end of the exciter shaft remote from the generator through a stationary housing 40 which is provided with sealing means of any suitable type. Water is discharged radially through suitable radial openings or passages from the annular discharge passage between the tubes 37 and 38 into a stationary housing or chamber 41 encircling the shaft and provided with suitable seals. Since a relatively large volume of water is required at substantial pressures and high velocity, the seals must be capable of containing the water under these conditions. A preferred type of sealing means is shown in a patent to Heller, et al U.S. Pat. No. 3,733,501, although any suitable type of seal could be used. It will be noted that this arrangement places the seals in locations of minimum radius. That is, the seal for the housing 40 is essentially on the axis, while the seals for the chamber 41 are on the end of the exciter shaft which is of small diameter as compared to the generator shaft. Thus, the peripheral speeds at the seal locations are relatively low, and the sealing problems and losses are minimized.

Figure 3:
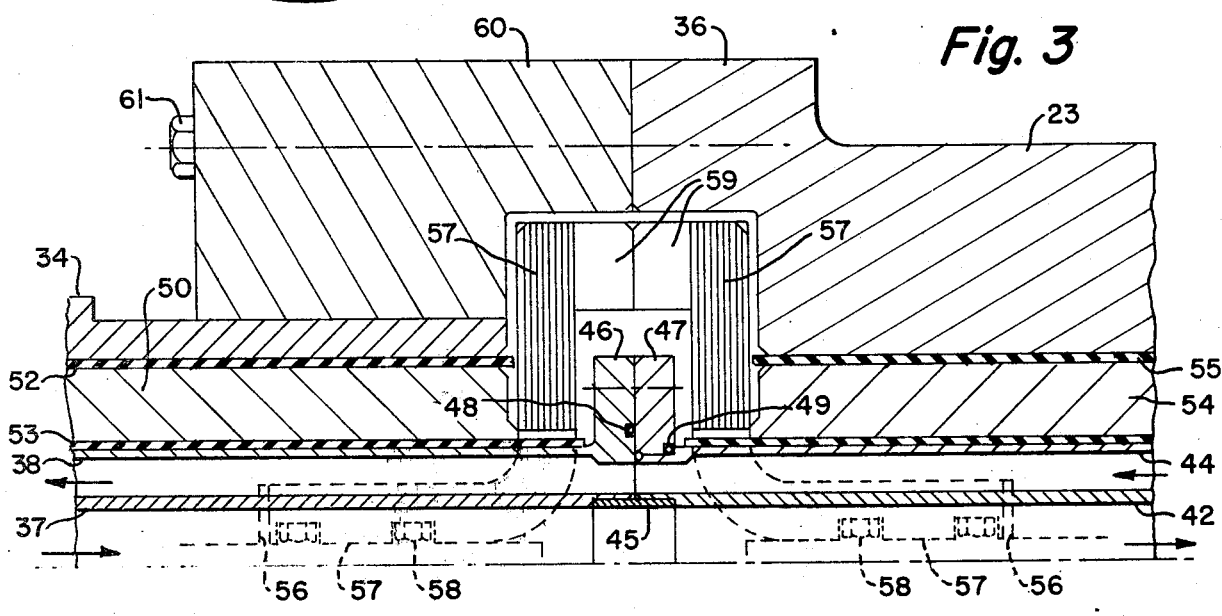
FIG. 3 is a longitudinal sectional view of the coupling between the exciter shaft and the generator shaft.

The rotor 18 of the generator also has an axial bore extending centrally thereof. Water tubes 42 and 44 corresponding to the tubes 37 and 38, respectively, and preferably of the same diameters, are provided in the bore of the rotor 18. The tubes 42 and 44 are disposed concentrically and positioned in longitudinal alignment with the tubes 37 and 38, as shown in FIG. 3. The tubes 37, 38, 42 and 44 may be made of any suitable corrosion resistant material but are preferably made of stainless steel to withstand the corrosive effects of the coolant water which circulates through them.

The respective pairs of corresponding tubes are connected together at the junction of the exciter and generator shafts in such a manner as to prevent escape of any substantial amount of liquid, and to permit the joints between the tubes to be made and disassembled with relative ease. For this purpose, the central tubes 37 and 42 are connected by a sleeve member 45 which may be secured in an annular recess at the end of one of the tubes and which fits snugly into a corresponding recess at the end of the other tube. This provides a joint which securely connects the two tubes and provides a reasonably good seal to prevent the escape of any substantial amount of water. If a small amount of leakage does occur through this seal, however, it is of no particular significance since the water merely escapes into the annular discharge passage between the tubes 37 and 38 and is carried out with the discharged coolant. Since the sleeve 45 is slideable in one of the tubes, this connection permits some relative axial movement between the tubes to allow for thermal expansion and contraction. The two outer tubes 38 and 44 are joined together with a liquid-tight seal. For this purpose, these tubes have radial flanges 46 and 47, respectively, which are bolted or otherwise rigidly joined together. One or more O-rings 48 are provided to make a liquid-tight seal between the flanges, or they may be sealed together in any other desired manner. Preferably, the flange 47 of the tube 44 is made removable, as by threading it on the end of the tube with an O-ring 49 for sealing it.

Figure 2:
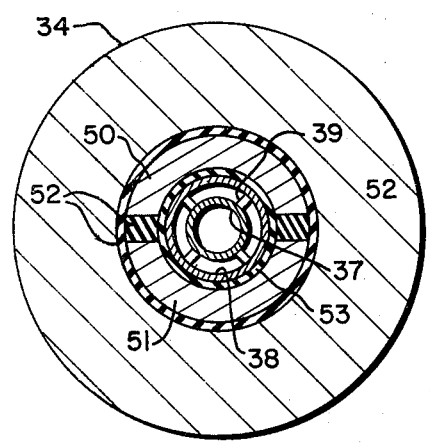
FIG. 2 is an enlarged transverse sectional view of the exciter shaft substantially on the line II—II of FIG. 1.

As previously indicated, the electrical leads from the exciter to the rotor winding 24 must also be accommodated in the bores of the exciter and generator shafts. As shown particularly in FIGS. 2 and 3, the field leads 50 and 51 in the exciter shaft 34 are made in the form of semi-tubular members, that is, elongated members having semi-cylindrical surfaces so that each lead is essentially half of a tube. It has been found that by using this construction the leads 50 and 51 can be fitted in the shaft bore and still have adequate cross-sectional area to carry the high generator field currents. The leads 50 and 51 are insulated from the shaft and from each other by insulation generally indicated at 52, and the outer water tube 38 is covered with an insulating layer 53. Thus, the leads 50 and 51 are fully insulated and fit together, as indicated in FIG. 2, to completely enclose the water tubes 37 and 38. It will be noted that the leads 50 and 51 are placed close together and substantially on the axis of the shaft so that their magnetic fields tend to cancel and the losses and induced currents that might otherwise be caused are eliminated. The leads 50 and 51 also serve to locate and position the water tubes 37 and 38 in the shaft bore, and the coolant water flowing in the outer tube 38 has a significant cooling effect on the leads. Corresponding leads 54 are provided in the generator shaft 23. The leads 54 are insulated from the shaft and each other by insulation 55 and are of the same configuration as the leads 50 and 51. The leads 54 are aligned with the leads 50 and 51 and enclose the water tubes 42 and 44. The leads 54 are thus disposed in the same manner as the leads 50 and 51 and with the same advantages.

It will be understood that the leads 50 and 51 are energized from the exciter 32 in the usual manner, that is, by radial leads (not shown) extending through the shaft 34 and into the leads 50 and 51, respectively. Connection between the exciter leads 50 and 51 and the corresponding generator leads 54 is preferably made within the coupling 36 in the manner shown in FIG. 3. As there shown, each of the semi-tubular leads 50 and 54 is cut away at its end, as indicated at 56, and a flexible connector 57 is attached to it. The connectors 57 may be of laminated copper construction for flexibility with high current carrying capacity, and have bifurcated ends to straddle the tubes 38 and 44. The connectors 57 are securely attached to the ends of the respective conductors as by bolts 58. The connectors 57 extend radially past the flanges 46 and 47 with sufficient spacing for adequate electrical clearance. Each of the flexible connectors 57 has a contact block 59 brazed or otherwise attached to its upper end, and the blocks 59 are brazed together or otherwise joined to complete the connection. The lead 51 is similarly connected to the corresponding lead 54. The flexible connectors 57 8 the longitudinal thermal expansion of the conductors which occurs when they become heated by the heavy field currents. It will be understood that any desired type of flexible connector may be used which extends around or past the flanges 46 and 47 to effect electrical connection between corresponding conductors in the exciter shaft and the generator shaft.

The coupling 36 may be of any suitable type which encloses the joints and connections between the water tubes and the field leads and which provides the necessary mechanical driving connection between the generator shaft and the exciter shaft. As shown, the coupling includes a coupling member 60 which is slideably mounted on the exciter shaft 34, as by splines, keys or other means, so as to be capable of axial movement away from the coupling flange of the generator shaft 23 to permit access to the water tubes and the conductors for making the joints and connections described above. After the tubes have been joined and the electrical connections completed, the coupling member 60 is then moved axially into its position shown in FIG. 3 and the coupling is completed by means of bolts 61 or in any other desired manner. Connection to the field winding 24 from each of the conductors 54 may be made in the manner shown in FIG. 4. A radial lead 62 which may be a heavy insulated copper stud extends through a radial opening in the shaft 23 and is threaded into the conductor 54. Suitable leads 63 are attached to the radial studs 62 and extend through slots (not shown) in the shaft 23 for connection to the rotor winding 24.

Figure 5:
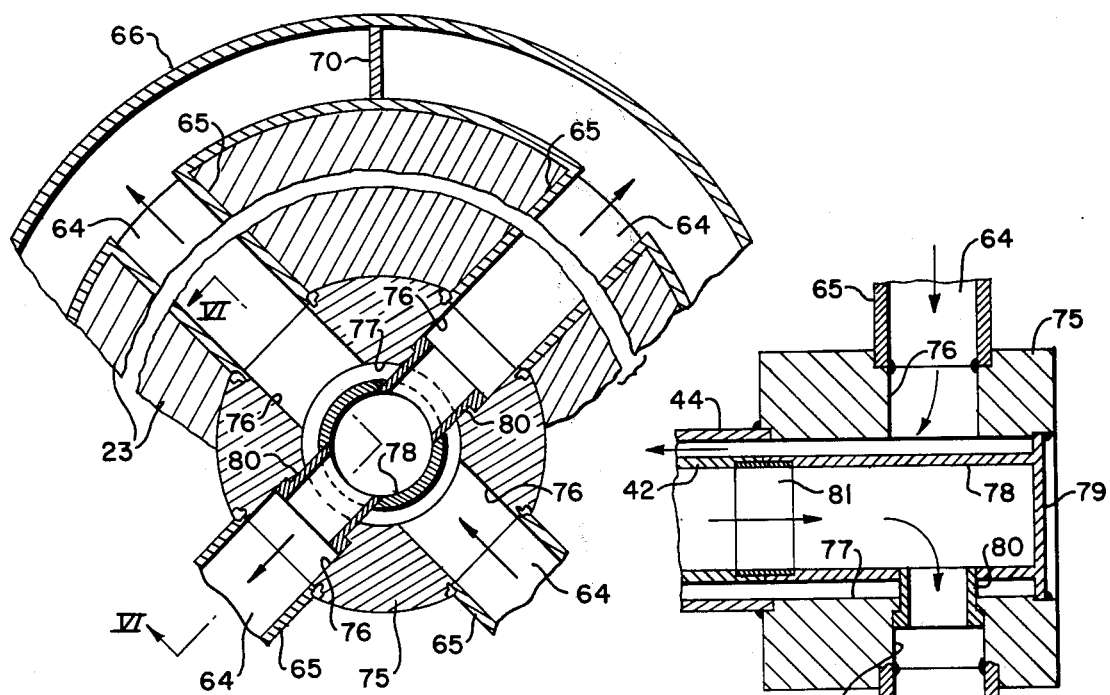
FIG. 5 is a fragmentary transverse sectional view substantially on the line V—V of FIG. 4.

Cooling water flowing through the water tubes is directed to and from the rotor winding conductors 26 in the manner shown in FIG. 4. As there shown, water entering through the tube 42 flows radially outward through passages 64 in the shaft 23 which have stainless steel liners 65 to protect the rotor steel from the corrosive effects of the water. An annular distribution chamber 66, preferably also of stainless steel, is mounted on the outside surface of the shaft 23 completely encircling the shaft for receiving water from the passages 64. Water flows from the chamber 66 through suitable connections, which include insulating hoses 67, to a plurality of water tubes or hydraulic connectors 68 disposed in axial slots in the shaft 23. The connectors 68 are individually attached to the winding conductors 26, preferably in the end turn portions 28 as indicated. Water flows through the conductors 26 in any desired flow pattern and returns through other connectors 68 which return the heated cooling water to the chamber 66. The respective entrance and return portions of the chamber 66 are separated by partitions 70, as shown in FIG. 5, which preferably divide the chamber into four quadrants to provide two entrance portions and two return portions. Water is discharged from the return portion of the chamber 66 through other radial passages 64 to the annular discharge passage between the tubes 42 and 44. The insulating connectors 67 and the water tubes 68 may be secured in position on the shaft by any desired means such as retaining rings 71 and wedges 72.

Figure 6:
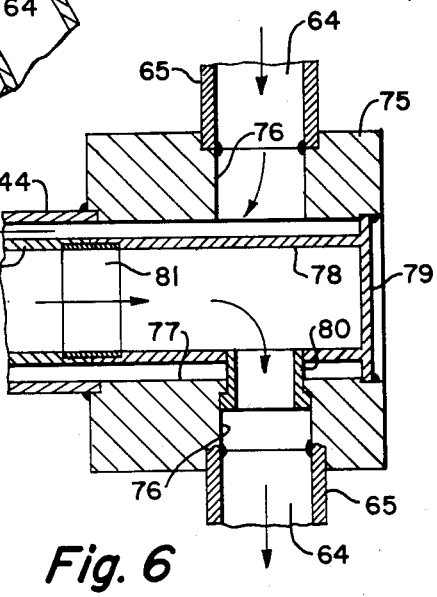
FIG. 6 is a sectional view of the line VI—VI of FIG. 5.

In accordance with the present invention, a transition member 75 is provided for directing the coolant water to and from distribution chamber 66. As shown in FIGS. 5 and 6, the transition member 75 may be made of a generally cylindrical block of stainless steel which is shrink fitted or otherwise firmly secured in the bore of the rotor shaft 23. The transition member 75 has four generally radial openings 76 and a central bore 77. A tubular member 78 extends through the bore 77 and is substantially coaxial with the water tube 42. The tube 78 terminates in a partition 79 which is welded or otherwise secured in the member 75 to form a water-tight seal therewith. Two of the radial openings 76 which are diametrically opposite each other communicate directly with the bore 77 of the transition member 75, while the other two radial openings 76 are provided with short tubular members 80 which are welded in place and penetrate the wall of the tube 78 so that they communicate directly with the interior of the tube 78.

The central water tube 42 is connected to the tube 78, and sealed to it, by a sleeve member 81 which forms a sliding seal similar to the seal between the tubes 37 and 42 previously described. The outer water tube 44 is aligned with the bore 77 and is connected to the transition member 75 with a water-tight seal, as by welding. The radial openings 76 are aligned with the radial passages 64 in the shaft 23 and the stainless steel liners 65 are welded or otherwise sealed in the openings 76. It will be seen, therefore, that coolant water flowing through the central passage formed by the tube 42 flows into the tubular member 78, which constitutes a first flow chamber, and through the short tubes 80 to two of the passages 64 and to the distribution chamber 66. Warm water returning from the rotor winding into the other two sections of the chamber 66 flows radially inward through the other two passages 64 and the corresponding openings 76 into the annular space on the outside of the tube 78, which constitutes a second flow chamber, and thus into the discharge passage formed between the tubes 42 and 44.

The transition member 75, as previously indicated, is shrink fitted or otherwise rigidly attached to the shaft 23. The transition member 75, and the tubes 42 and 44 which are attached to it, are thus anchored in place at this end of the water tubes. These tubes and the tubes 37 and 38, however, are not otherwise restrained in the axial direction and are free to move axially with respect to the shaft, so that any differential thermal expansion is provided for. The clearance between the flanges 46 and 47 and the adjacent connectors 57 is made sufficient to allow for this axial movement of the water tubes. If desired, however, some or all of the expansion of the tubes could be absorbed by a suitable bellows interposed at an appropriate place, as shown for example in Heller et al Patent 3,740,595.

It will now be apparent that a construction has been provided for liquid cooled rotors in which the coolant liquid is both introduced and discharged through the exciter shaft, but in which a simple and compact arrangement is provided which permits the water passages and the field leads to be contained within the conventional shaft bores. A relatively simple construction is provided and it will be noted that all components are accessible for inspection and repair and can be moved if necessary. Thus, the water tubes 37, 38 and 42 and the conductors can be removed axially after the coupling 36 is disassembled, the conductors 54 in the generator shaft being axially removable by removing the flange 47 from the tube 44. The tube 44 can be removed after cutting it free from the member 75. A highly desired construction is thus provided which has the advantages previously discussed of eliminating the necessity for seals and shaft-weakening openings in the turbine end of the generator shaft, so that the undesirable effects and losses due to these features are eliminated.

What is claimed is:

1. In combination, a main generator and an exciter therefore, the generator and exciter each having a rotor member including a shaft portion, said shaft portions being positioned in axial alignment and having central bores therethrough, two concentric tubes disposed in the bore of the exciter shaft substantially on the axis thereof to form two passages extending axially through the exciter shaft, said tubes being adapted to receive and discharge coolant liquid at their ends remote from the generator for flow through said passages, two semi-tubular insulated conductors disposed in the bore of the exciter shaft, said conductors enclosing the tubes and extending axially to the end of the shaft adjacent to generator shaft, two concentric tubes disposed in the bore of said generator shaft in alignment with the first-mentioned tubes, two semi-tubular insulated conductors disposed in the bore of the generator shaft and enclosing the last-mentioned tubes, means for joining together the corresponding tubes and the corresponding conductors in the exciter and generator shafts and for mechanically coupling together the exciter and generator shafts, said generator rotor having windings thereon, and means for circulating coolant liquid from one of said tubes in the generator shaft through said windings and for discharging said liquid from the windings to the other of said tubes.

2. The combination of claim 1 including means for making a substantially liquid-tight seal between the outer tubes of the exciter and generator shafts, flexible connecting means for electrically connecting together the corresponding conductors of the exciter and generator shafts and coupling means enclosing the connections of the tubes and conductors and mechanically coupling the exciter shaft and the generator shaft.

3. The combination of claim 1 in which the inner tubes of the exciter shaft and the generator shaft are joined by a sleeve member secured to one tube and extending into the other tube with a snug fit to form a seal, and in which the outer tubes of the exciter shaft and the generator shaft terminate in abutting flanges, means for securing said flanges together, and means for forming a substantially liquid-tight seal between the flanges.

4. The combination of claim 3 and including flexible connectors extending over said abutting flanges and electrically connecting corresponding conductors of the exciter shaft and the generator shaft.

5. The combination of claim 4 and including coupling means for mechanically coupling together the exciter shaft and the generator shaft, said coupling means enclosing said abutting flanges and connectors and including a coupling element axially movable sufficiently to allow access to the flanges and connectors.

6. A rotor member for a dynamoelectric machine, said rotor member having a shaft portion and a body portion carrying windings, said windings having passages for circulation of a liquid coolant, said shaft portion having a central bore extending axially therethrough, two concentric tubes disposed in said bore and extending coaxially thereof, the inner of said tubes providing a first shaft passage for coolant and the annular space between the inner and outer tubes providing a second shaft passage for coolant, two semi-tubular insulated conductors disposed in the shaft bore and enclosing the tubes, means for electrically connecting said conductors to said windings, and means connecting said shaft passages to said winding passages for circulation of liquid coolant from one of the shaft passages to the winding passages and from the winding passages to the other shaft passage, a transition member disposed in the shaft bore, said transition member having two separate flow chambers, one of said chambers communicating with said first shaft passage and the other of said chambers communicating with said second shaft passage, and radial passages extending through the shaft to connect the flow chambers to the winding passages for flow of liquid coolant from one flow chamber to the winding passages and from the winding passages to the other flow chamber.

7. A rotor member as defined in claim 6 in which the transition member has a central cylindrical flow chamber communicating with said inner tube and an annular flow chamber surrounding the central flow chamber and communicating with said outer tube, radial tubes penetrating the annular flow chamber and connecting the central flow chamber to certain of said radial passages, and the annular flow chamber having radial openings connecting with others of said radial passages.

8. A rotor member as defined in claim 7 in which said inner tube is connected to the central flow chamber by an internal sleeve member having a snug fit to form a seal, and the outer tube is joined to the transition member with a substantially liquid-tight seal.

* * * * *